US 6,726,277 B1

(12) United States Patent
Samaha

(10) Patent No.: US 6,726,277 B1
(45) Date of Patent: Apr. 27, 2004

(54) VEHICLE SEAT AND STEERING WHEEL SUNSHADE

(76) Inventor: Thomas J. Samaha, 1951 Lombardy Dr., La Canada, CA (US) 91011

( * ) Notice: Subject to any disclaimer, the term of this patent is extended or adjusted under 35 U.S.C. 154(b) by 0 days.

(21) Appl. No.: 10/274,308

(22) Filed: Oct. 18, 2002

(51) Int. Cl.[7] .............................................. B60J 11/00
(52) U.S. Cl. ............................. 297/184.11; 297/184.1; 297/219.1; 297/223; 297/224; 160/370.21
(58) Field of Search .............................. 297/219.1, 224, 297/225, 229, 184.1, 223, 184.11, 184.15, 184.14; 150/154; 160/349.1, 370.21

(56) References Cited

U.S. PATENT DOCUMENTS

| | | | | |
|---|---|---|---|---|
| 1,817,404 A | * | 8/1931 | Whaley | 297/225 |
| 2,601,881 A | * | 7/1952 | Oberlin, Sr | 74/558.5 |
| 4,396,227 A | | 8/1983 | Neilson | |
| 4,458,738 A | * | 7/1984 | Wilson | 150/154 |
| 4,659,144 A | * | 4/1987 | Reese | 297/184.11 |
| 4,676,376 A | * | 6/1987 | Keiswetter | 206/494 |
| 4,685,499 A | * | 8/1987 | Black | 150/154 |
| 4,821,785 A | * | 4/1989 | Rolan | 150/166 |
| 4,828,319 A | * | 5/1989 | Benson | 296/136.03 |
| 4,877,074 A | | 10/1989 | Castellano | |
| 4,943,105 A | * | 7/1990 | Kacar et al. | 296/24.2 |
| 5,024,262 A | | 6/1991 | Huang | |
| 5,114,204 A | * | 5/1992 | Bernardo | 296/136.03 |
| 5,275,463 A | * | 1/1994 | Rocha | 297/229 |
| 5,655,810 A | * | 8/1997 | Shikler | 296/136.03 |
| 5,806,925 A | | 9/1998 | Hanley | |
| 5,833,310 A | * | 11/1998 | Labelle | 297/184.1 |
| 6,056,355 A | | 5/2000 | Klassen | |
| 6,070,640 A | * | 6/2000 | Miyagawa et al. | 160/121.1 |
| 6,116,256 A | | 9/2000 | Pawsey et al. | |
| 6,131,639 A | * | 10/2000 | McMillen et al. | 160/123 |
| 6,192,967 B1 | | 2/2001 | Huang | |
| 2002/0063455 A1 | * | 5/2002 | Self | 297/229 |

FOREIGN PATENT DOCUMENTS

| | | | | |
|---|---|---|---|---|
| GB | 2185391 A | * | 7/1987 | A47C/31/10 |
| GB | 2257356 A | * | 1/1993 | A47C/31/11 |

* cited by examiner

Primary Examiner—Peter M. Cuomo
Assistant Examiner—Stephen D'Adamo
(74) Attorney, Agent, or Firm—Lawrence N. Ginsberg

(57) ABSTRACT

A vehicle seat and steering wheel sunshade including a main covering and at least one side panel. The main covering includes a front portion for covering a steering wheel region of a vehicle, a rear portion for covering a seat back region of a vehicle seat, and an intermediate portion between the front portion and the rear portion for covering a seat region of the vehicle seat. The at least one side panel depends from the main covering for providing enhanced covering of the vehicle seat.

12 Claims, 3 Drawing Sheets

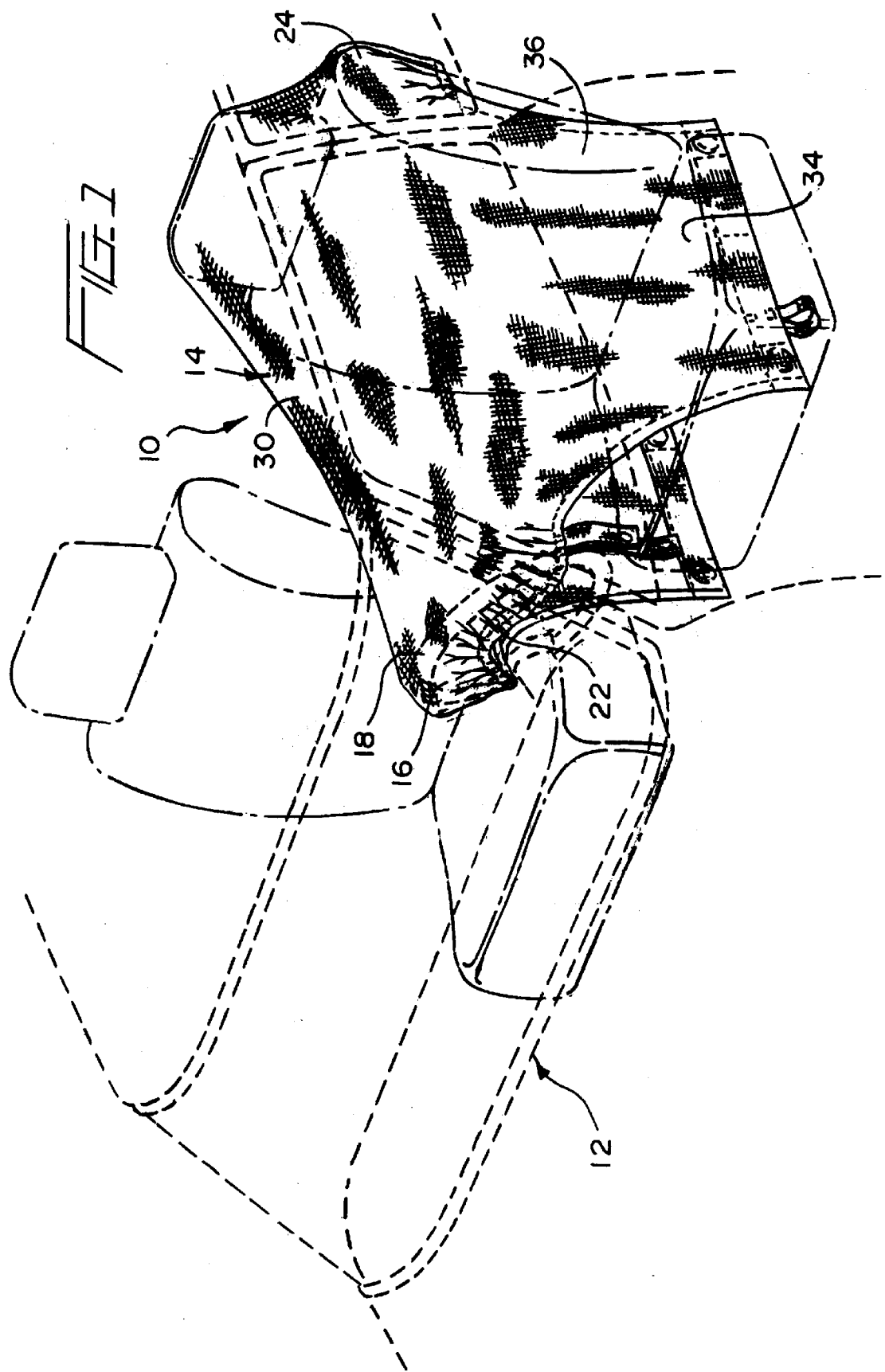

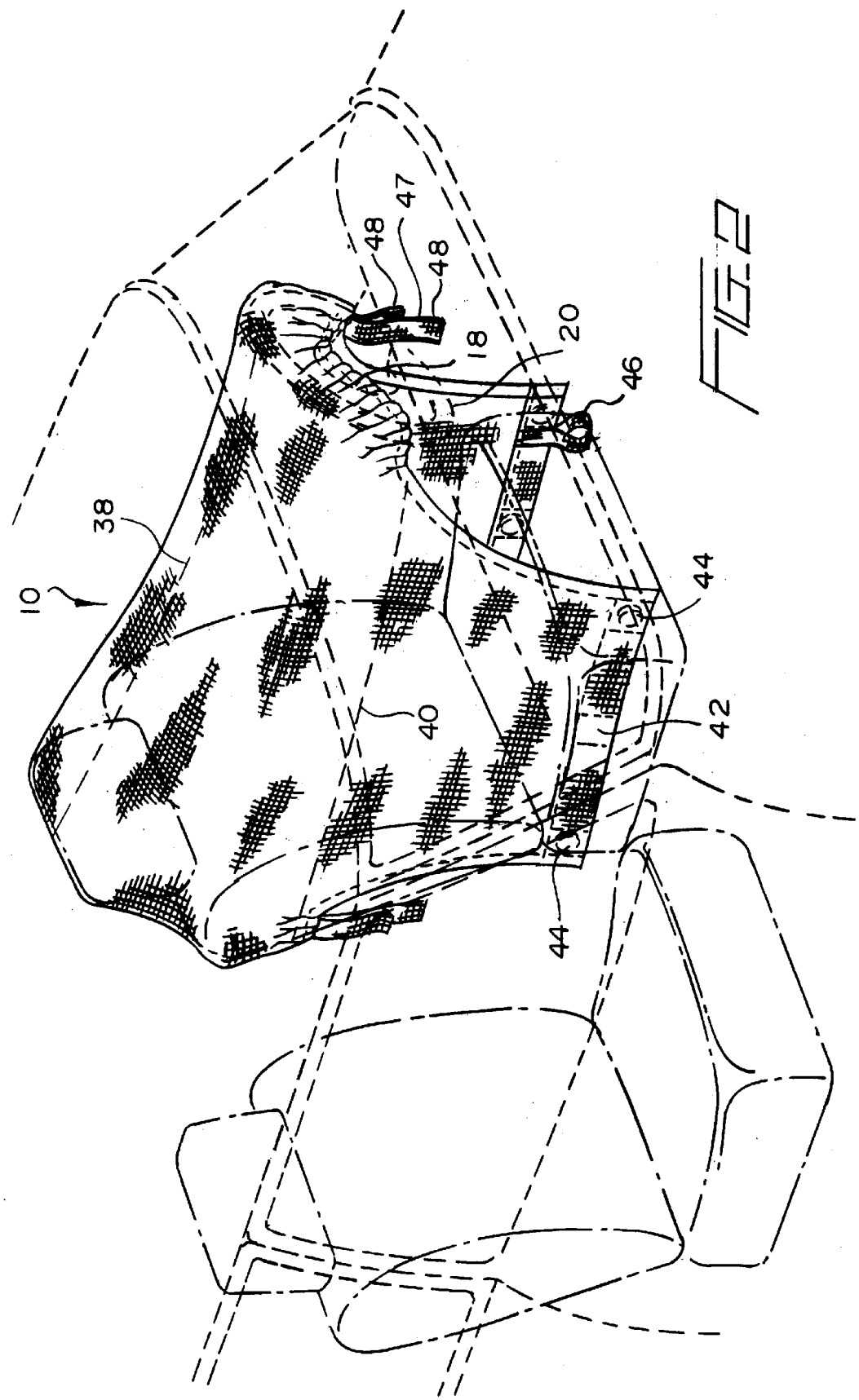

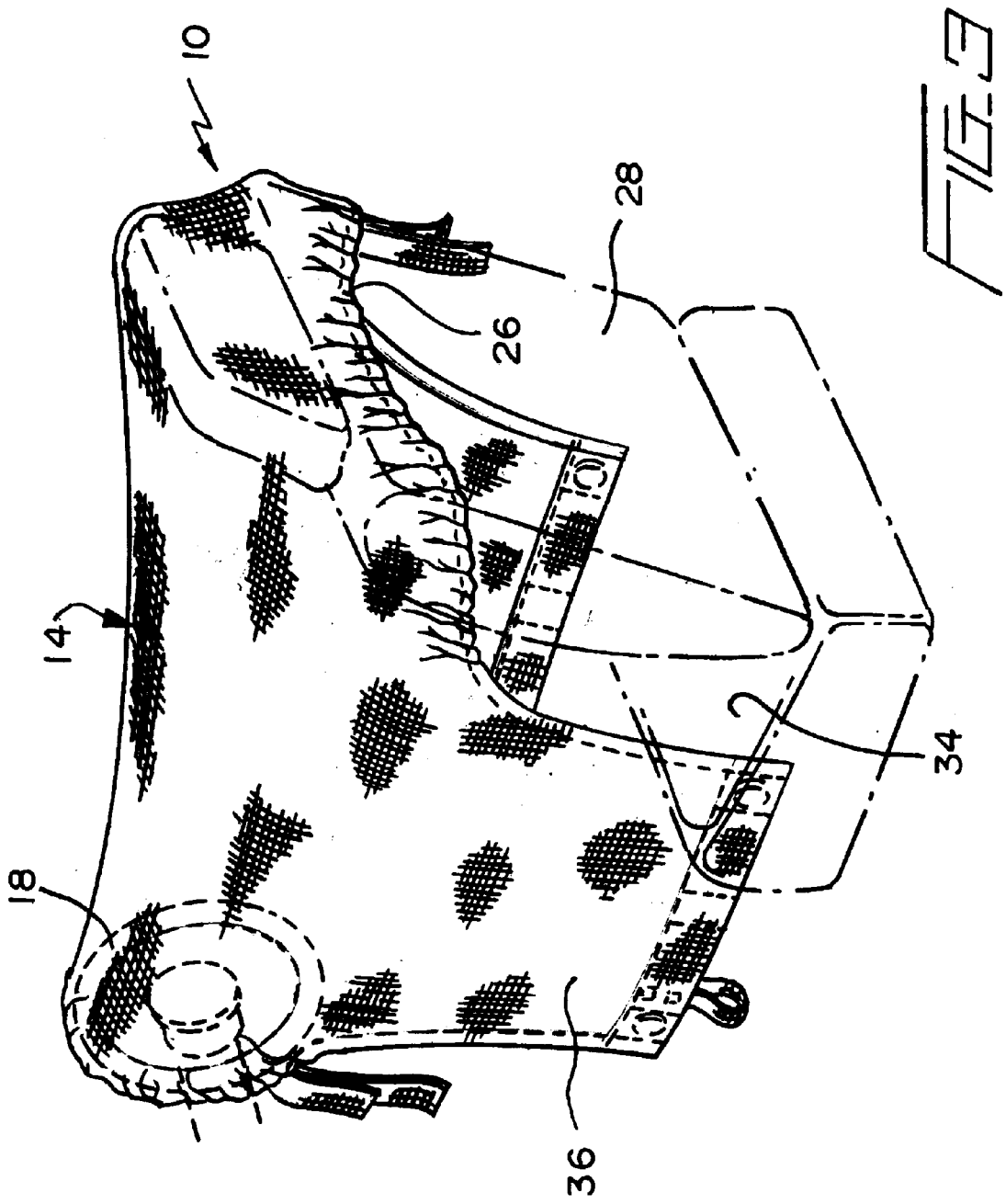

VEHICLE SEAT AND STEERING WHEEL SUNSHADE

BACKGROUND OF THE INVENTION

1. Field of the Invention

The present invention relates to sunshades for vehicles and more particularly to a sun shade for protecting the seat and steering wheel of an automobile when the vehicle is not in use.

2. Description of the Related Art

There are a number of sunshades or sunscreens that have been advanced in the prior art. Most of these are positioned over the forward windshield, the back window, or the side windows of the vehicle. For example, U.S. Pat. No. 4,877,074, issued to A. J. Castellano, discloses a sun screen that includes a plurality of sections adapted to assume a generally planar configuration when extended and a compact configuration when folded in an accordion-like manner. Adjacent sections are coupled in a hinge-like manner by linear arrays of perforations to facilitate folding of the sun screen, which may then be retained in the folded configuration by an elastic strap disposed thereabout. An upper, median portion of the sun screen includes a narrow slot extending downward from an upper edge along the center, linear array of perforations and terminates in a circular aperture. A second plurality of linear arrays of perforations are disposed radially about an upper portion of the aperture, terminating in the upper edge of the sun screen. The circular aperture is adapted to receive a rearview mirror support member mounted on or adjacent to the windshield by inserting the mirror support through the aforementioned slot. The radial perforations allow the sun screen adjacent to the aperture to flex for insertion of the mirror support through the slot and into the aperture, then allowing the sun screen to assume its generally planar configuration following mirror support insertion such that the slot again narrows. The mirror support is thus securely engaged by the aperture for maintaining the sun screen disposed over and in close proximity to the inner surface of the windshield. The sun screen is preferably comprised of a lightweight, opaque, semi-rigid material such as cardboard.

U.S. Pat. No. 6,192,967, issued to S. E. L. Huang, discloses a collapsible automobile shade formed of fabric that pivots about a pivot point, or a pair of pivot points, as in its larger embodiment, and which are expandable into a shaped configuration for adherence, as through usage of a suction cup, double face tape, or other forms of securement, to the interior of in automobile windshield, when installed, to prevent the entrance of sunlight and sun rays. The shade may be disassembled, collapsed about its pivotal ribs, into a closed configuration, in preparation for storage, as within the glove compartment of a vehicle. An alternative embodiment to the shade includes its fabrication from a flexible material, that has inherent memory, containing a series of aligned flutes, which can be expanded to form a shade of multiple shaped configurations, but due to the inherent memory of the fluted material, can be contracted by alignment of its adjacent flutes, into a compact position, and even folded into compact closure, also for storage within the glove compartment of a vehicle.

U.S. Pat. No. 5,024,262, issued to E. L. Huang, discloses a sunshade comprising a single elongated loop of a thin strip of spring-like material covered by a sheet of one or more layers of a flexible material. The shape of the elongated loop can vary from a generally rectangular shape with slightly rounded corners to an oval or generally elliptical shape. One or both of the two major surfaces of the sheet are adapted to reflect light and heat radiation from the sun. In its normally open configuration, the sunshade is placed against the inside surface of an automobile windshield or window with a reflective surface facing outward. The single elongated fabric-covered loop of the sunshade can be easily twisted and folded into a compact configuration consisting of a series of smaller concentric loops and fabric layers. The sunshade may additionally comprise a means for maintaining the compact configuration for storage.

U.S. Pat. No. 6,116,256, issued to R. J. Pawsey et al, discloses a collapsible sun shade, including: a shade; at least two supports, each support having a first end and a second end, with the second end of each support coupled to the shade at spaced-apart locations thereof; and a connector coupled to the first end of each support. The shade is adapted to assume an unstable equilibrium position in which the supports and the shade are substantially coplanar with the connector, a collapsed position when the shade and supports are on one side of the unstable equilibrium position in which the shade is folded, and a deployed position when the shade and supports are on the other side of the unstable equilibrium position in which the supports and the shade are expanded.

Most of these prior art sunshades provide limited coverage over the vehicle seat unless multiple units are used and some require complicated mechanisms. As will be disclosed below, the present invention is an inexpensive, compact means for conveniently shading the steering wheel and seat region of the vehicle seat.

SUMMARY

In a broad aspect, the present invention is a vehicle seat and steering wheel sunshade including a main covering and at least one side panel. The main covering includes a front portion for covering a steering wheel region of a vehicle, a rear portion for covering a seat back region of a vehicle seat, and an intermediate portion between the front portion and the rear portion for covering a seat region of the vehicle seat. The at least one side panel depends from the main covering for providing enhanced covering of the vehicle seat.

The front portion and the rear portion attach to the steering wheel and seat back regions of the automobile. The intermediate portion is suspended above the seat and thus provides enhanced coverage of the entire seat region.

The present invention shades substantially the entire seat, cooling it and protecting the seat from fading. The space provided between the sunshade and the seat region can be used to hide items, for example briefcases and packages, when the vehicle is not being operated. The present invention is particularly useful for SUVs that do not have covered trunk space.

Other objects, advantages, and novel features will become apparent from the following detailed description of the invention when considered in conjunction with the accompanying drawings.

BRIEF DESCRIPTION OF THE DRAWINGS

FIG. 1 is a front, left perspective view of the vehicle seat and steering wheel sunshade of the present invention in a vehicle environment.

FIG. 2 is a front, right perspective view of the vehicle seat and steering wheel sunshade of FIG. 1.

FIG. 3 is a rear, left perspective view of the vehicle seat and steering wheel sunshade.

The same parts or elements throughout the drawings are designated by the same reference characters.

DETAILED DESCRIPTION OF THE INVENTION

Referring now to the drawings and the characters of reference marked thereon, FIGS. 1–3 illustrate a preferred embodiment of the vehicle seat and steering wheel sunshade of the present invention, designated generally as 10. The sunshade 10 is shown positioned with an automobile, designated generally by phantom lines 12.

The sunshade 10 includes a main covering, designated generally as 14. The main covering 14 includes a front portion 16 for covering a steering wheel region 18 of the vehicle 12. The front portion 16 of the main covering 14 includes elastic 22 along a front edge thereof to provide a snug fit about the steering wheel region 18. Similarly, a rear portion 24 of the main covering 14 includes elastic 26 along a rear edge thereof to provide a snug fit about the seat back region 28 of the vehicle seat. An intermediate portion 30 of main covering 14 between the front portion 16 and the rear portion 24 covers, i.e. shades, a seat region 34 of the vehicle seat. The intermediate portion 30 is suspended over the seat region 34. As used herein the term "seat back region" is defined broadly to encompass the headrest as shown in the figures.

At least one side panel 36 depends from the main covering 14 for providing enhanced covering of the vehicle seat. If only one side panel 36 is used it should be preferably positioned on the side of the vehicle which will provide the most sun protection. In the preferred embodiment shown in FIGS. 1–3 two side panels 36 are provided. Each depends from a respective side of the intermediate portion 30. Thus, the sunshade 10 is symmetrical about a central longitudinal axis 38 thereof.

If an imaginary line 40 is drawn to distinguish the intermediate portion 30 from the side panels 36 it can be seen that each of the side panels 36 has a nearly trapezoidal shape, the sides thereof being curved. This allows for convenient use with a large number of vehicle sizes and configurations and it provides aesthetic advantages. When the sunshade 10 is positioned in the vehicle 12 it presents as substantially saddle-shaped. Both the front portion 16 and the rear portion 24 have substantially the same dimensions allowing convenient reversible use of the sunshade 10.

The distal ends 42 of the side panels 36 are preferably weighted to maintain the side panels down to provide optimal coverage of the vehicle seat. In the embodiment illustrated, two weights 44 are positioned at each side of each distal end 42. Each weight 44 has a weight in a range of about ½ to about 2 ounces, preferably about 1 ounce. The weights are preferably stitched within respective pockets at the distal end 42.

An elastic storage strap 46 is provided for conveniently consolidating the vehicle seat and steering wheel sunshade 10 when not in use. The sunshade material is simply bunched up and maintained between the loop formed by the strap 46.

The sunshade 10 is preferably formed of nylon material; however, it may be made of other suitable lightweight material that protects from the sun by minimizing light transmission.

The sunshade 10 is particularly useful for convertible automobiles. Unlike sunshades that fit within the windshields of the autos, the present sunshade 10 protects the steering wheel, seat and seat back regions regardless of whether the auto has a top. To protect against theft, a locking strap 47 is provided. The locking strap 47 includes two openings 48 on respective ends thereof to provide access to a lock (not shown). The locking strap 47 secures the sunshade 10 to the steering wheel 18. Preferably, two locking straps 47 are provided, one at the front portion 16 and one at the rear portion 24. This provides convenient reversible use.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A vehicle seat and steering wheel sunshade, comprising:
   a) a main covering comprising a front portion for attachment to and for covering a steering wheel region of a vehicle, a rear portion for covering a seat back region of a vehicle seat, and an intermediate portion between said front portion and said rear portion for covering a seat region of the vehicle seat; and
   b) two side panels, each depending from a respective side of said main covering for providing enhanced covering of the vehicle seat, said vehicle seat and steering wheel sunshade being symmetrical about a central longitudinal axis thereof, said front portion and said rear portion having substantially the same dimensions allowing convenient reversible use of the sunshade and wherein said front portion and said rear portion each include elastic along edges thereof to provide snug fits about the steering wheel region and seat back region, respectively.

2. The vehicle seat and steering wheel sunshade of claim 1, wherein said two side panels each depend from a respective side of said intermediate portion.

3. The vehicle seat and steering wheel sunshade of claim 1, wherein said two side panels each depend from a respective side of said intermediate portion, said vehicle seat and steering wheel sunshade being substantially saddle-shaped when positioned in a vehicle.

4. The vehicle seat and steering wheel sunshade of claim 1, wherein each side panel has a nearly trapezoidal shape, the sides thereof being curved.

5. The vehicle seat and steering wheel sunshade of claim 1, wherein each side panel includes at least one weight at a distal end to optimize covering of the vehicle seat.

6. The vehicle seat and steering wheel sunshade of claim 1, wherein each said-side panel includes at least one weight at a distal end to optimize covering of the vehicle seat, said weight having a weight in a range of about ½ to about 2 ounces.

7. The vehicle seat and steering wheel sunshade of claim 1, wherein said main covering and each side panel is formed of nylon material.

8. The vehicle seat and steering wheel sunshade of claim 1, further including an elastic storage strap for conveniently consolidating said vehicle seat and steering wheel sunshade when not in use.

9. The vehicle seat and steering wheel sunshade of claim 1, wherein said front portion of said main covering includes a locking strap to lock the vehicle seat and steering wheel sunshade to the steering wheel region.

10. A vehicle seat and steering wheel sunshade, comprising:
    a) a main covering comprising a front portion for attachment to and for covering a steering wheel region of a vehicle, a rear portion for covering a seat back region of a vehicle seat, and an intermediate portion between said front portion and said rear portion for covering a seat region of the vehicle seat, said front and rear portions having elastic to provide snug fits about the steering wheel region and the seat back region of the vehicle, respectively; and, b) two side panels, each depending from a respective side of said intermediate portion for providing enhanced covering of the vehicle seat, each side panel including at least one weight at a distal end to optimize covering of the vehicle seat, said front portion and said rear portion having substantially the same dimensions allowing convenient reversible use of the sunshade and wherein said front portion and said rear portion each include elastic along edges thereof to provide snug fits about the steering wheel region and seat back region respectively.

11. A method for shading seat and steering wheel regions of a vehicle, comprising the steps of:

a) attaching a front portion of a main covering of a sunshade to the steering wheel region of a vehicle; and, b) attaching a rear portion of said main covering to a seat back region of the vehicle, so that an intermediate portion of the sunshade is suspended over a seat region of the vehicle to provide shading thereof, and wherein two side panels depending from said main covering provide enhanced shading of said vehicle seat, said front portion and said rear portion having substantially the same dimensions allowing convenient reversible use of the sunshade and wherein said front portion and said rear portion each include elastic alone edges thereof to provide snug fits about the steering wheel region and seat back region, respectively.

12. The method of claim 11, wherein said step of attaching a rear portion of said main covering comprises suspending said two side panels each depending from a respective side of said intermediate portion.

* * * * *